United States Patent
Weston (10) Patent No.: US 6,264,136 B1
(45) Date of Patent: Jul. 24, 2001

(54) HIGH EFFICIENCY COMBINATION WING AIRCRAFT

(76) Inventor: Paul H. Weston, 4214 W. Lake Sammamish Pkwy. NE., Apt. 306, Redmond, WA (US) 98052

( * ) Notice: Subject to any disclaimer, the term of this patent is extended or adjusted under 35 U.S.C. 154(b) by 0 days.

(21) Appl. No.: 09/123,118

(22) Filed: Jul. 27, 1998

(51) Int. Cl.$^7$ ........................................................ B64C 3/38
(52) U.S. Cl. ............................................ 244/48; 244/219
(58) Field of Search ........................... 244/39, 36, 200, 244/199, 198, 219, 105, 106, 48, 203, 82

(56) References Cited

U.S. PATENT DOCUMENTS

| | | | |
|---|---|---|---|
| 1,906,005 | * | 4/1933 | Hall ........................................ 244/48 |
| 2,152,981 | * | 4/1939 | Taylor .................................... 244/48 |
| 2,362,224 | * | 11/1944 | Roseland ................................ 244/48 |
| 2,410,234 | * | 10/1946 | Read et al. .............................. 244/2 |
| 2,416,958 | * | 3/1947 | Sears ..................................... 244/203 |
| 2,541,922 | * | 2/1951 | Hosford . | |
| 2,630,986 | * | 3/1953 | Gumbs .................................. 244/48 |
| 2,908,454 | * | 10/1959 | De Wolff ............................... 244/216 |
| 2,953,322 | * | 9/1960 | Lewis .................................... 244/48 |
| 3,029,043 | * | 4/1962 | Churchill ............................... 244/7 C |
| 3,055,618 | * | 9/1962 | Brislawn ................................ 244/87 |
| 3,632,064 | * | 1/1972 | Oliver .................................... 244/13 |
| 3,795,373 | * | 3/1974 | Gerard .................................... 244/48 |
| 3,870,253 | * | 3/1975 | Leidy et al. ............................ 244/48 |
| 4,415,132 | * | 11/1983 | Shirk ...................................... 244/48 |
| 4,566,657 | * | 1/1986 | Grow ...................................... 244/36 |
| 4,962,978 | * | 10/1990 | Weston .................................. 244/105 |
| 5,395,073 | * | 3/1995 | Rutan et al. ............................ 244/39 |
| 5,863,013 | * | 1/1999 | Schmittle ............................... 244/39 |
| 5,909,858 | * | 6/1999 | Hawley .................................. 244/36 |

* cited by examiner

*Primary Examiner*—Charles T. Jordan
*Assistant Examiner*—Tien Dinh
(74) *Attorney, Agent, or Firm*—Delbert J. Barnard (57) ABSTRACT

The aircraft (20,50,60) combines a low aspect ratio lifting body (21) and a higher aspect ratio wing (30). Horizontal and vertical tail surfaces (26, 24) are connected to the rear of the lifting body (21) by one or more booms (23). The wing (30) is attached to the lifting body (21) such that it can be rotated about a spanwise axis (39) and it's aerodynamic center is located behind the aerodynamic center of the lifting body (21). The wing (30) contains adjustable surfaces (31, 32) to change the wing's camber for lift and roll control. A lever arrangement (FIG. 7) controlled by the pilot or remote control operator selectively and relatively pivots the wing (30) and contours the wing surfaces for camber to optimize the lift and control of the lifting body (21) and the wing (30) for maximum efficiency in all flight modes.

9 Claims, 6 Drawing Sheets

A - LIFTING BODY
B - WING

FIG. 9

A - LIFTING BODY
B* - WING
* - FLAPS AT 30°

HIGH EFFICIENCY COMBINATION WING AIRCRAFT

TECHNICAL FIELD

This invention relates to aircraft and, more particularly, to the provision of an aircraft that combines a low aspect ratio lifting body with a higher aspect ratio wing that is rotatable about a spanwise axis for the purpose of providing optimum lift by the lifting body and the wing at different flight modes from high speed to extreme low speed.

BACKGROUND OF THE INVENTION

The resultant force on a wing section can be specified by two components of force perpendicular and parallel to the air stream (the lift and drag respectively) and by a moment in the plane of these two forces (the pitching moment). These forces are functions of the angle of attack of the section.

Figure 9:
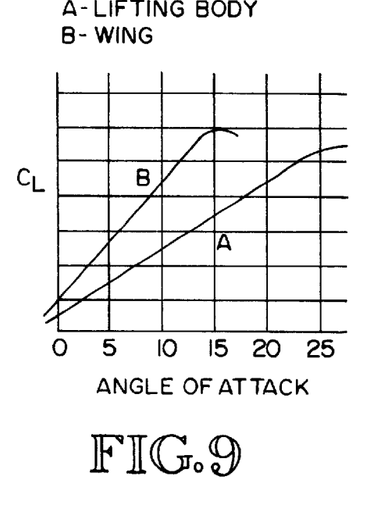
FIG. 9 is a plot of the lift coefficient against the angle of attack for both the lifting body and the wing of the aircraft depicted in FIGS. 1–3 and 13–16 in cruise configuration.
Figure 10:
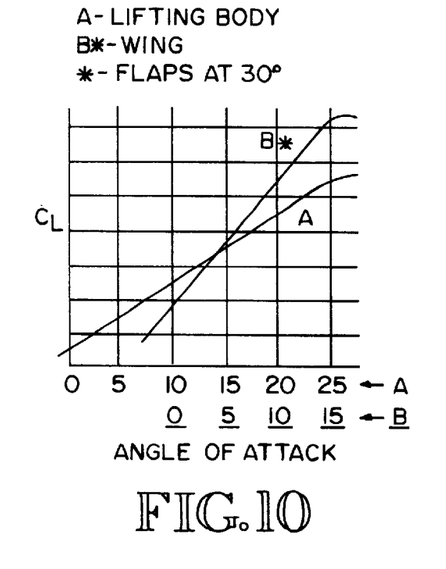
FIG. 10 is a plot of the lift coefficient against the angle of attack for both the lifting body and the wing of the aircraft depicted in FIGS. 1–3 and 13–16 in landing configuration.
Figure 11:
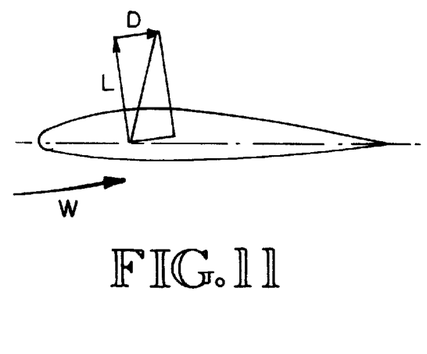
FIG. 11 is a vector diagram of the lift and drag for a wing at a low angle of attack.
Figure 12:
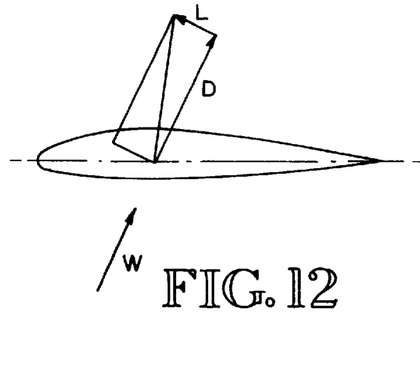
FIG. 12 is a vector diagram of the lift and drag for a wing at an angle of attack greater than stall.

The lift force a wing section is capable of producing is usually plotted relative to the angle of attack (AOA). See FIGS. 9 and 10 of the drawings. As the wing section AOA increases beyond the stall angle the lift force perpendicular to the AOA decreases abruptly, but the drag force parallel to the AOA increases dramatically and becomes greater than the pre-stall lift force. FIGS. 11 and 12 illustrate this. In FIGS. 11 and 12 L is the lift vector, D is the drag vector, and W is the relative wind direction or AOA. The present invention exploits this post-stall force as will be shown later.

The aerodynamic center (AC) of a wing is defined as the point along the chord line at which the pitching moment is constant, and is at or near the mean quarter chord point, except for delta wings where the AC is at the center of area. Wing lift can be thought of as working through the AC with any pitch moment acting about that pint. Symmetrical wings are wings with no camber (top and bottom surfaces mirror images of each other) and have a zero pitch moment. A wing with positive camber (mean chord line bowed upwardly) will have a negative or downward pitch moment about the AC. The greater the camber the greater the lift force the wing can produce and the greater the negative pitch moment. Wing camber can be varied by using flaps, slats, or ailerons.

Aspect ratio (AR) is defined as the wing span divided by the mean chord length. The aerodynamic characteristics of a wing with a very low AR are much different than for a high AR wing. The lift slope angle is much smaller and it reaches its maximum lift at a much higher angle of attack (AOA) and the maximum lift before stalling is lower.

A delta shaped wing is a low AR wing with additional differences. As the AOA increases a pair of vortex spirals generate at the leading edge and increase in size as they progress to the trailing edge and as the AOA increases. The vortices feed dynamic air over the top surfaces of the wing, lowering the pressure and thus producing lift to angles of attack as high as 80 degrees. Since the AC of a delta wing is already at the center of area there is little movement of the center of lift as the AOA changes. These differences are beneficially exploited by this invention as will be shown later.

The present invention combines a low aspect ratio wing with a delta forebody, which for the sake of brevity will be called the "lifting body", and to which a tail is fixedly attached, and a high aspect ratio wing that is pivotally attached to the lifting body.

Airfoils create lift in two ways. The first way is by making the air travel a longer distance around the foil on the top. This lowers the average air pressure on the top relative to the bottom, and produces lift. This kind of lift is dominant at zero AOA. The other way of creating lift is by deflecting the air downwards (mass transport), much like a rocket throws mass downward creating an equal and opposite reaction. If an airfoil has a positive camber it will create lift at zero AOA and have a negative pitching moment. The pressure distribution of an airfoil sums up to create the net lift and moment effect. Typically the lower side of the foil has a (negative) pressure lower than the free stream pressure because the flow must speed up around the downwardly curving surface. If the lower surface is changed to be made flat for a small distance of say twenty percent (20%) chord, then that surface would not produce negative suction lift buy only positive mass transport lift. Since the bottom surface must converge with the top surface to form an air foil, such a flat angled surface cannot continue very long. By continuing on with a rounded or flat (segmented) surface, the bottom side will converge with the top to form an airfoil. By changing the length of the flat section and its slant into the flow where the downward suction is the greatest, the new foil, with a very similar camber profile as before, can be made to have a POSITIVE pitching moment. This design leads to a higher drag than a normal streamlined airfoil of laminar shape. The bottom surface will be laminar up until the point the flat surface ends, and then be turbulent thereafter. The preferred embodiment of this invention uses flat surfaces on the underside of the lifting body.

Typical laminar foils can achieve laminar flow to seventy percent (70%) of chord on the bottom side. This compares to the loss of around fifty percent (50%) of chord (70–20) that will be turbulent instead of laminar because of the flat surfaces. A laminar foil has typically about fifty-five percent (55%) of the skin in laminar flow, and the rest is turbulent. The flat slanted new airfoil will only have thirty percent (30%) in laminar flow. A laminar flow wing has around 1.45 times more drag than an ideal one hundred percent (100%) laminar flow wing. The new foil would have around 1.7 times that of an one hundred percent (100%) laminar wing. A completely turbulent wing has around 2 times the drag of a one hundred percent (100%) laminar flow wing. Adding in the angle of attack of the slant may, of course, make the new foil have more drag than a turbulent foil, but not my much, if any.

The dominant reasons for having slanted flat surfaces on the bottom of the lifting body is for making water operation practical, and to have a positive pitch moment. A curved surface creates lift, and water is around 800 times as dense as air and therefore creates 800 times as much (negative) lift. A flat surface will not create the negative suction lift but only mass transport positive lift. By having a series of flat surfaces on the bottom surface of the foil that approximate the bottom surface of a normal airfoil, a relatively streamlined shape is achieved. By placing a small step at the point where the flat surface transitions to another flat surface, most of the suction (negative) lift is eliminated up front of the lifting body where the moment arm from the CG is large. With a traditional larger second step near the CG, water operation is practical, and the tendency common to traditional boat hulls and floats, with their curved foreplane surfaces, to plow deeply while getting on the step and to nose over in rough water, is eliminated by the small front step. The aerodynamic and hydrodynamic benefits of the flat surfaces and the two steps more than offset the small increase in drag.

Low aspect ratio or delta type aircraft are limited primarily to high Mach numbers and or high thrust to weight where the low L/D at low speed is not a problem. Conventional aircraft with high aspect ratio wings are limited to lower Mach numbers and smaller angles of attack.

The aircraft of this invention combines the lifting body with a wing that can be pivoted so that the lifting body can reach its optimum angle of attack, near twenty seven (27°) for maximum lift, while the wing remains unstalled at about fifteen degrees (15°) AOA. By having the flaps lowered and the ailerons drooped, all the lifting surfaces are contributing maximum lift for slow speed landings or fast descents.

Figure 2:
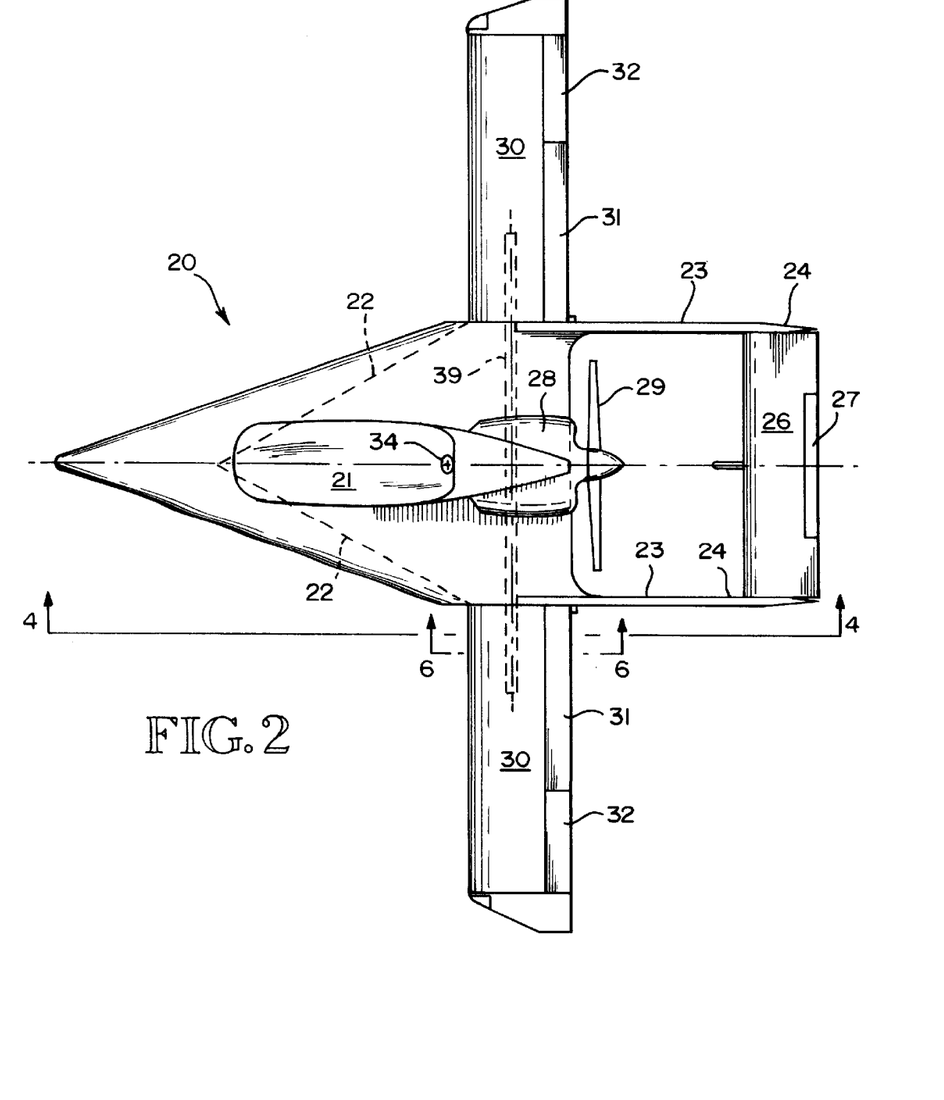
FIG. 2 is a top plan view of the aircraft of FIG. 1.

When the flaps are lowered and the ailerons drooped, the wing camber is increased which increases the negative pitching moment of the wing which must be compensated for to maintain stability. Conventional aircraft increase the negative lift of the tail which increases the load the wing must support. The wing of this invention is located relative to the lifting body such that the AC of the wing is longitudinally behind the AC of the lifting body, as shown in FIG. 2. When the wing is pitched down the incidence angle of the wing becomes negative relative to the incidence angle of the lifting body which produces a positive pitching moment couple that cancels the increased negative pitch moment produced by the concurrent flap deployment. The pitch moments are thus balanced through all wing pitch and flap deployment angles. The aircraft can be flown through the full flight envelope with very little pitch trim and no increased trim drag.

One of the principal advantages of the aircraft invention is the inherent longitudinal stability that results from the AC of the high AR wing being behind the AC of the low AR wing. This can be understood by looking at the lift slope graphs of FIGS. 9 and 10. When the aircraft angle of attack changes due to speed changes, elevator movement, gusts, turbulence, or wind sheer, the lift changes more rapidly on the high AR wing than on the low AR wing. Since the AC of the high AR wing is behind the AC of the low AR wing, the differential lift distribution creates a pitch moment that pitches the aircraft into the relative airstream. This makes the aircraft act like it has a higher static margin (the fore-and-aft distance between the CG and the AC) than it actually has and thus the CG range can be expanded and moved back closer to the AC of the entire aircraft without reducing static and dynamic longitudinal stability. This stability is independent of varying wing pitch angles and flap deployment and is effective through the entire flight envelope.

As a conventional wing stalls the center of lift moves back to the center of area. This coupled with a loss of lift pitches the nose down. If there is enough down force by the tail the nose can be kept up and the plane will mush down with the wing still producing lift. This is very desirable for obvious safety reasons. The aircraft of the invention has this capability without the penalty of high negative tail force. As the wing stalls the aircraft center of lift does not move back to the aircraft center of area. When the wing stalls the lifting body produces relatively more lift than the wing due to the continuing vortex lift of the lifting body. Since the center of lift (COL) of the lifting body is forward of the wing COL the resultant COL shift of the aircraft is small compared to a conventional aircraft. This phenomena plus the CG location near the aircraft AC means the pitch down moment at wing stall is relatively small.

The vortex lift over the lifting body continues after the wing stalls to AOA over about seventy degrees (70°) and the flow remains relatively parallel to the lifting body chord line. This flow continues to feed dynamic air to the tail surfaces at extreme AOA so the aircraft remains controllable in a stalled flight mode. The transition from unstalled to stalled flight and back to unstalled flight is very smooth and requires very little pitch control to maintain attitude. Because of this exceptional control the aircraft is capable of some unusual maneuvers and in an emergency landing can be flared to 60 degrees AOA for extremely low speed at touch down.

DISCLOSURE OF THE INVENTION

An aircraft, according to the present invention, comprises a lifting body, with aspect ratio less than two, including horizontal and vertical tail surfaces attached to structure extending rearwardly from the lifting body to provide yaw and pitch control and stability to the aircraft. A wing, with aspect ratio greater than three is connected to the lifting body for pivotal movement relative to the lifting body about a spanwise axis extending near the aerodynamic center of the wing and rearwardly of the aerodynamic center of the lifting body. A mechanism is provide for rotating the wing relative to the lifting body about the spanwise axis for the purpose of providing the optimum lift by the lifting body and the wing at different flight modes from high speed to extreme low speed. Portions of the wing are moveable relative to the wing enabling the camber of the wing to be changed for the purpose of role control of the aircraft about the longitudinal axis and to increase the lift coefficient of the wing at low speeds. Preferably, the wing camber and pivot position are coupled so that when the wing incidence angle is positioned relatively close to the incidence angle of the lifting body the wing camber is minimum and the aircraft is configured for minimum drag at high speed.

In the preferred embodiment, the wing camber is changed automatically and proportionally as the wing pitch changes. The low aspect ratio lifting body attains a maximum lift coefficient at an angle of attack near 28 degrees to the relative wind while the higher aspect ratio wing produces a maximum lift coefficient near 16 degrees angle of attack to the relative wind. When the wing is rotated to a negative incidence angle of near 12 degrees relative to the incidence angle of the lifting body the wing camber is automatically increased to its maximum and both the wing and lifting body are configured relative to each other to produce maximum lift at low speed.

The lifting body is preferably configured such that its pitch moment about its aerodynamic center is positive and when the incidence angles of the lifting body and the wing are nearly the same the negative pitch moment of the wing nearly cancels the positive pitch moment of the lifting body. As the wing is pitched negative to the lifting body a positive pitch moment couple is produced, due to and proportional to the distance the wing AC is behind the lifting body AC. Since the wing camber is increased, as the wing is pitched negatively, the increasing negative pitch moment of the wing nearly cancels the increasing positive pitch moment couple due to the negatively pitching wing.

The wing incidence angle relative to the incidence angle of the lifting body is adjustable by the operator while in flight from about plus four degrees (4°) to about minus tweleve degrees (12°). The distance the wing AC is behind the lifting body AC is fixed at a minimum of about one half (½) to a maximum of about three (3) times the wing mean aerodynamic chord length. The wing camber amount is automatically mechanically changed proportionally to be minimum when the wing incidence angle relative to the lifting body incidence angle is positive and maximum when the wing incidence angle is maximum negative. The amount of maximum camber can be adjusted by the operator while on the ground or in the air for trimming the aircraft.

Other aspects of the invention as hereinafter described. The entire document, including the drawings and the claims, form the Disclosure of the Invention.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein.

BEST MODE FOR CARRYING OUT THE INVENTION

Figure 1:
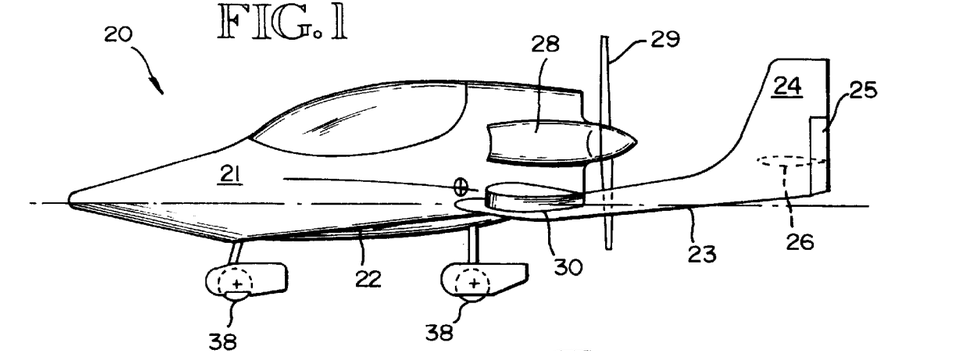
FIG. 1 is a side elevational view of a first embodiment of the present invention.
Figure 3:
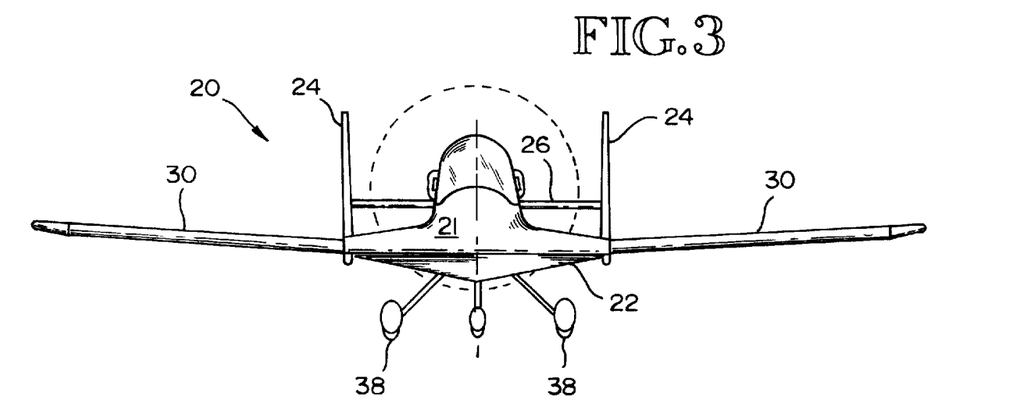
FIG. 3 is a front elevational view of the aircraft of FIG. 1 and 2.

FIGS. 1–7 constitute an illustration of one embodiment of an aircraft 20 according to the present invention which is capable of efficient and smooth straight and level flight and short field takeoffs and landings. The aircraft 20 comprises a low aspect ratio lifting body 21 containing controls, payload, and engine 28 rotating a propeller 29 for propulsion. The payload compartment is blended into the lifting body 21. This is best shown by FIGS. 1 and 3. Twin booms 23 extend rearwardly from the lifting body 21 and support the empennage which comprises vertical stabilizers 24, which in turn support rudders 25, and a horizontal stabilator 26, which in turn supports the anti-servo trim tab 27. Flat surfaces on the underside of the delta shaped forebody portion of the lifting body 21 slope downwardly and rearwardly from the leading edges of the lifting body and terminate at small diagonal steps 22 which create turbulence and a positive pitching moment to the lifting body 21. Wheels 38 are for ground maneuvering and may be fixed or retractable.

Wings 30 are either tapered or constant chord in plan form and have a higher aspect ratio than the lifting body 21 and contain flaps 31, used for increasing lift and drag, and ailerons 32 used for roll control which may be drooped when the flaps are deployed for increasing lift. Flaps 31 and ailerons 32 may be combined to form flapperons. The wings 30 are attached to the laterally outwardly rearwardly portion of the lifting body 21 and are coupled together in the unique manner described below to collectively pivot about a spanwise axis.

Figure 5:
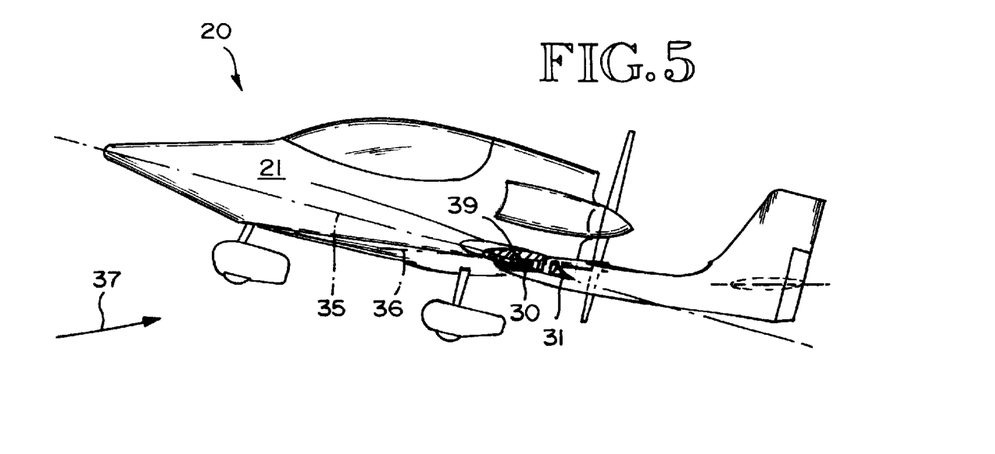
FIG. 5 is a sectional side elevational view of the aircraft of FIGS. 1–3 in a landing flight mode.
Figure 6:
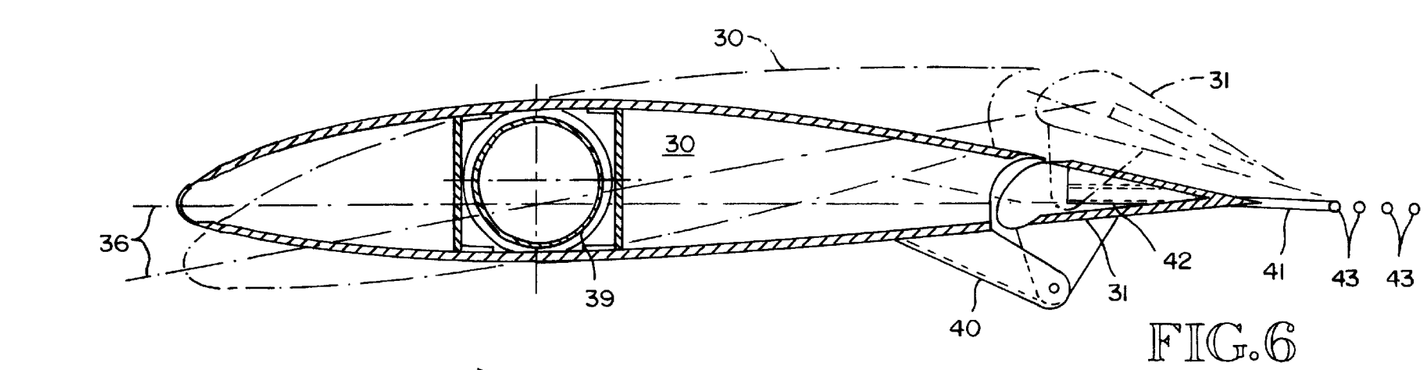
FIG. 6 is a sectional view taken through a wing of the aircraft depicted in FIGS. 1–5 and 13–16.
Figure 7:
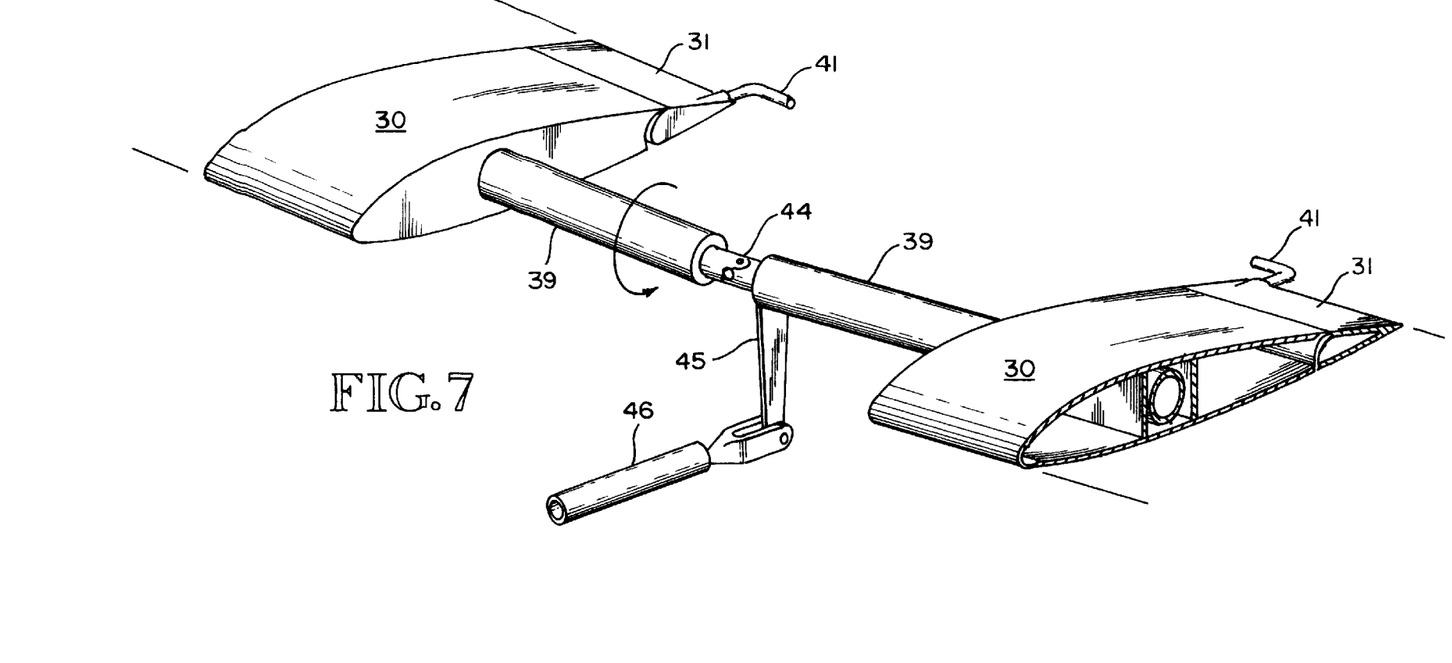
FIG. 7 is a pictorial view, partly in schematic form, showing a mechanism for pivoting the wings relative to the lifting body, with the lifting body and or stub wing center section omitted.

More specifically, with particular reference to FIGS. 1–7 a spar tube 39 extends laterally ninety degrees to the longitudinal center line of the lifting body and rearwardly of the center of gravity 34 and extends into the wings 30 relatively near the aerodynamic center of the wings 30 a distance sufficient to support the flight loads and is fixedly attached to the wings 30 with bolts or pins. The spar tube 39 is supported in the lifting body by bearings, which are not shown, that allow the wings and spar tube to rotate collectively about the spar tube axis. As shown in FIG. 7 a universal joint 44 connects the two halves of the spar tube to provide wing dihedral (FIG. 3), and a leverage system 45 and 46 extends to the pilot control area, not shown, whereby the operator may position the wing mean chord line 36 angle relative to the lifting body mean chord line 35. See FIGS. 4 and 5, for optimum efficiency in the various flight modes of takeoff, climb, cruise, decent, and landing.

Flaps 31 are attached to the wing 30 with hinges 40 as depicted in FIG. 6 and are automatically positioned relative to the wing, when the wing mean chord line 36 angle relative to the lifting body mean chord line 35 is changed, by pins 41 that slide in fixedly positioned sleeves 42 in the flaps 31 and pivot in sockets 43 that are fixedly positioned in the lifting body 21. Multiple sockets 43 (FIG. 6) allow the proportional amount of flap deployment, relative to the wing mean chord line 36 angle change, to be adjusted for pitch moment trim. It will be obvious to one experienced in the art that the sockets 43 could be made adjustable in the vertical plane so the pilot could make trim changes to the flaps while in flight, and further that the sockets 43 could be made differentially adjustable in the vertical plane so flapperons could be used instead of flaps and ailerons.

Ailerons 32 are hinged to the wings and controlled by any system standard to the art and are thus not shown in detail. The ailerons can also be rigged to droop proportionally as the flaps deploy downwardly.

Figure 4:
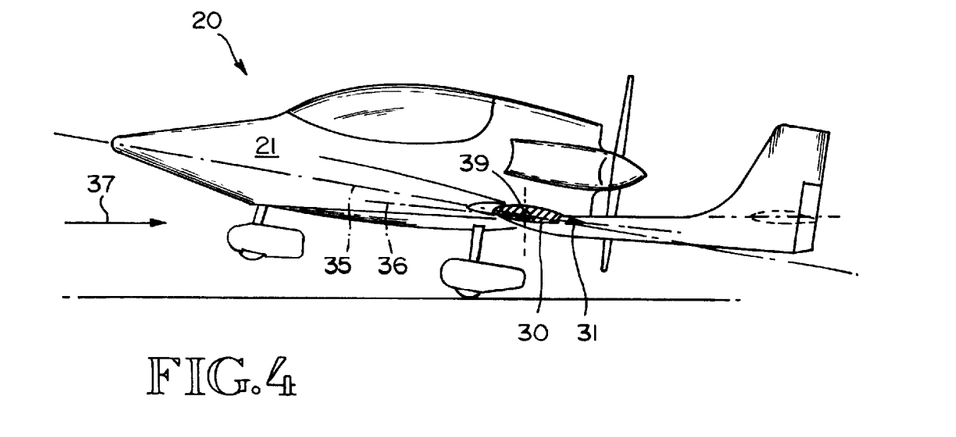
FIG. 4 is a sectional side elevational view of the aircraft of FIGS. 1–3, showing the aircraft in a takeoff flight mode.

FIGS. 4 and 5 depict the wing 30 positioned relative to the lifting body 21 for two of the various flight modes. FIG. 4 depicts the wing chord line 36 as being approximately minus four degrees relative to the lifting body mean chord line 35 and the flap 31 is positioned downwardly relative to the wing approximately twelve degrees. The lifting body angle of attack to the relative wind 37 at takeoff is approximately eleven degrees while the wing AOA is seven degrees to the relative wind 37. FIG. 5 depicts the aircraft 20 configured for rapid decent and short landing wherein the wing chord line 36 is approximately minus ten degrees relative to the lifting body mean chord line 35 and the flap 31 is positioned downwardly relative to the wing approximately thirty degrees. The lifting body angle of attack to the relative wind 37 is shown as approximately twenty four degrees while the wing AOA is fourteen degrees. It should be obvious to one experienced in the art that the aircraft configuration angles could vary from those described based on different wing loadings and power to weight loadings.

Figure 8:
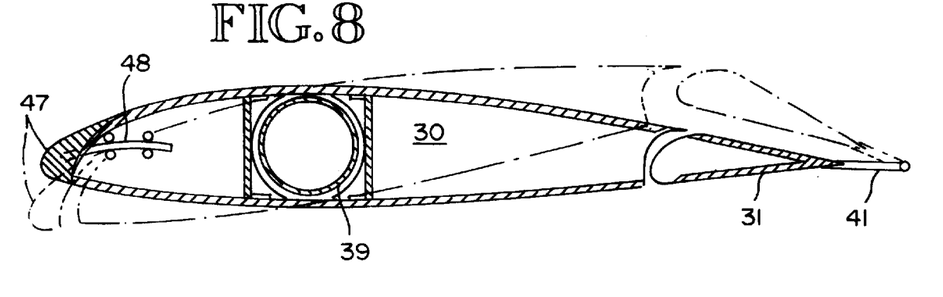
FIG. 8 is a sectional side elevational view like FIG. 6 but with the addition of leading edge slats.

FIG. 8 depicts a leading edge slat 47 with deployment mechanism 48 which is one of several types of lift enchancing leading edge devices that could be used with the aircraft of the present invention and could be mechanically coupled to deploy as the flaps deploy.

Figure 13:
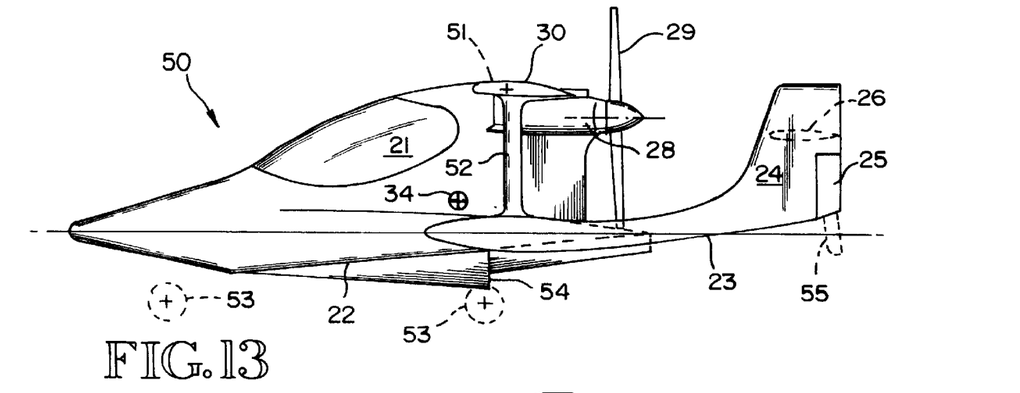
FIG. 13 is a side elevational view of an amphibious aircraft constituting a second embodiment of the present invention with wings pivotally attached to a center wing section at the top of the lifting body.
Figure 14:
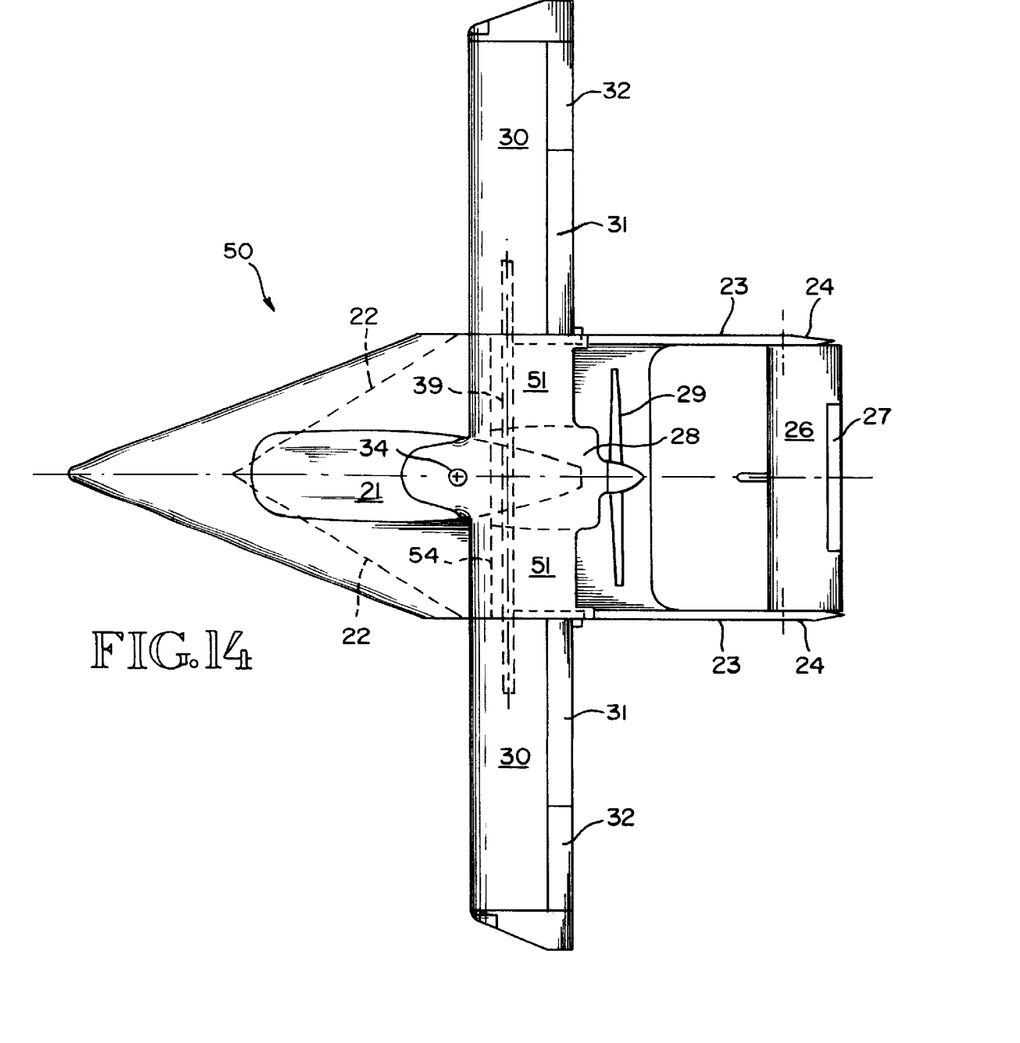
FIG. 14 is a top plan view of the aircraft of FIG. 13.
Figure 15:
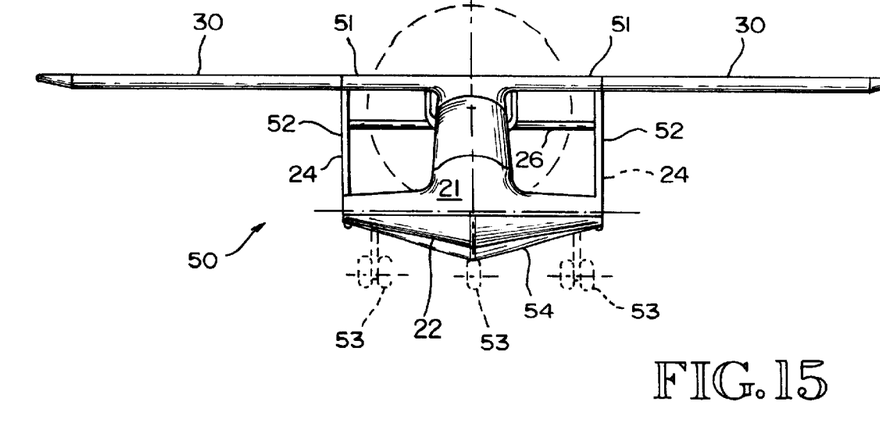
FIG. 15 is a front elevational view of the aircraft of FIGS. 13 and 14.

FIGS. 13–15 show a second embodiment of an aircraft 50 according to the present invention which is capable of efficient and smooth straight and level flight and takeoffs and landings both on water and land and, in emergencies, landings can be made at less than stall speed. The lifting body 21 is similar to the lifting body of aircraft 20 and contains a laterally disposed vertical step 54 located rearwardly of the center of gravity 34 on the underside of the lifting body and flat planing surfaces extending forwardly and upwardly from the bottom of step 54 to step 22 and flat planing surfaces extending forwardly and upwardly from the bottom of step 22 to the leading edge of the lifting body 21 which provide for maneuvering on water and a positive pitch moment to the lifting body.

The amphibious aircraft 50 contains water rudders 55, that retract into the air rudders 25, and retractable wheels 53. Stub wings 51 are fixedly attached laterally and rearwardly of the aircraft center of gravity 34 and near the top of the blended cockpit and engine pylon portion of the lifting body 21 and extend laterally outwardly the same span distance or less as that of the lifting body 21. Vertical struts 52 extend between the laterally outwardly ends of the lifting body 21 and the stub wings 51. Wings 30 are attached to and extend laterally outwardly from the stub wings 51 with a spar tube 39 which is positioned near the aerodynamic center of the wings and stub wings 51 and extends laterally through the stub wings 51 and into the wings 30 a distance sufficient to carry the flight loads. The spar tube 39 is attached to the wings using bolts or pins and is supported in the stub wings 51 by bearings such that the wings 30 and spar tube 39 can pivot collectively about the spar tube axis. A mechanism similar to that used in aircraft 20 and depicted in FIG. 7 is used to position the wing chord line angle relative to the lifting body mean chord line angle. The flap 31 and aileron 32 control mechanisms of aircraft 50 are relatively the same as aircraft 20 and their aerodynamic function is the same so the detailed descriptions are omitted here.

Figure 16:
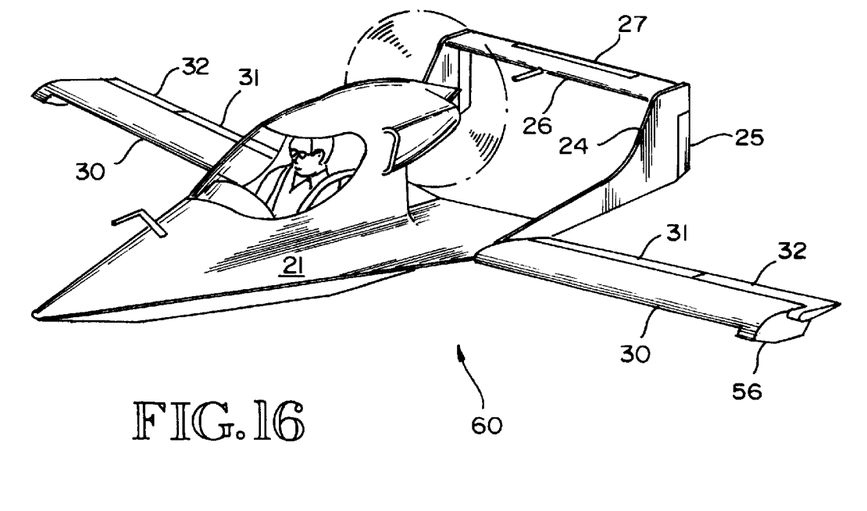
FIG. 16 is a pictorial view of an amphibious aircraft according to a third embodiment of the present invention with wings pivotally attached to the lifting body.

FIG. 16 is a pictorial illustration of a third embodiment of an aircraft 60 according to the present invention which is capable of efficient and smooth straight and level flight and short takeoffs and landings from water, and land if equipped with retractable wheels. The lifting body 21 is configured on the underside similar to aircraft 50 for water maneuvering. The wings 30 along with the flaps 31, ailerons 32, and spar tubes, are configured, attached, and controlled, relatively the same as the wings, flaps, ailerons, and spar tube, of aircraft previously depicted and described. The wings 30 additionally have floats 56 on the wing tips. The empennage is relatively the same as aircraft 20 and 50.

Although the foregoing illustrations and descriptions of the preferred embodiment include particular means for carrying out the invention, one skilled in the art will realize that other and different embodiments or modifications may be made without departing from the present invention as described in the claims that follow:

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An aircraft having a center of gravity and comprising:
    a lifting body having an aspect ratio less than two, a payload compartment and an aerodynamic center;
    a rotatable wing with an aspect ratio greater than three, said wing being rotatably connected to the lifting body rearwardly of the aircraft center of gravity, said wing having a wing aerodynamic center and being rotatable about a spanwise axis that is relatively near the wing aerodynamic center;
    said wing being rotatable in pitch relative to the lifting body;
    said wing including spanwise aerodynamic surfaces hinged to move automatically as the wing is rotated such that the wing camber is increased and decreased automatically proportionally as the wing is rotated relative to the lifting body; and
    wherein rotation of the wing to decrease its angle of attack relative to the lifting body increases the angle of attack of the lifting body, and rotation of the wing to increase its angle of attack relative to the lifting body decreases the angle of attack of the lifting body.

2. The aircraft of claim 1, including horizontal and vertical tail surfaces connected to the rear of the lifting body by one or more booms for pitch and yaw control.

3. The aircraft of claim 1, wherein each half of the wing is connected to a laterally outward portion of the lifting body.

4. The aircraft of claim 1, wherein each half of the wing is connected to a stub wing that is fixed laterally to a raised central portion of the lifting body.

5. The aircraft of claim 1, wherein the forebody portion of the lifting body is delta shaped.

6. The aircraft of claim 1, including one or more engines to provide thrust.

7. The aircraft of claim 1, including wheels for maneuvering on land.

8. The aircraft of claim 1, including hydro planing surfaces and steps on the underside of the lifting body for maneuvering on water.

9. The aircraft of claim 1, including hinged trailing edge roll control surfaces on said wings movable to provide differential aerodynamic force roll control.

* * * * *